March 9, 1954 D. ADAMS 2,671,694
DEMOUNTABLE WHEEL CONSTRUCTION
Filed April 21, 1952 2 Sheets-Sheet 2
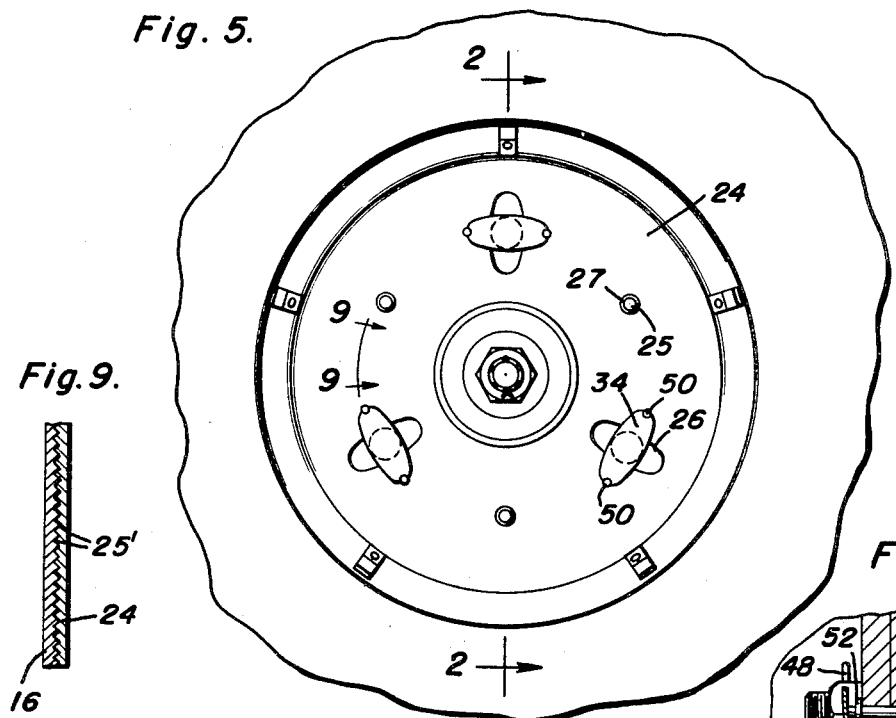
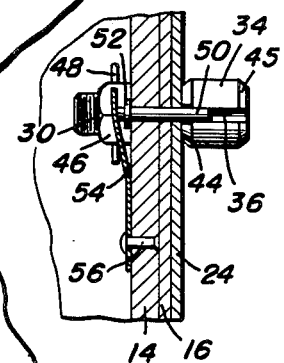
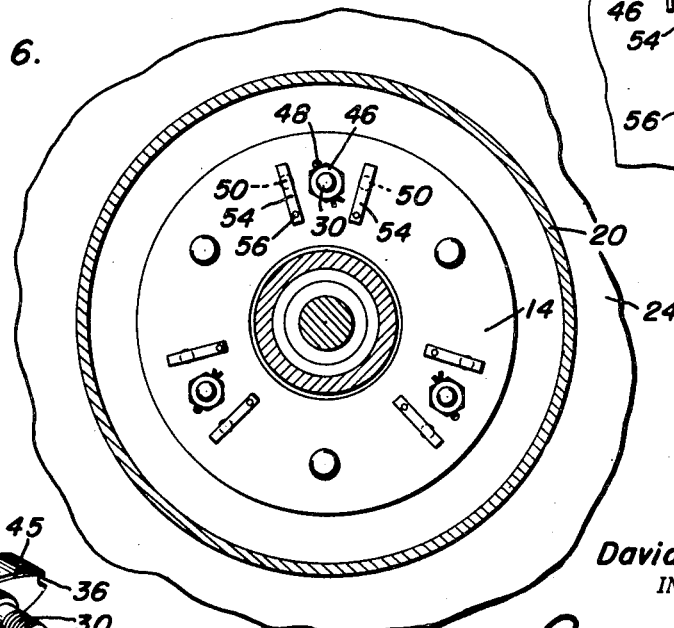
David Adams
INVENTOR.
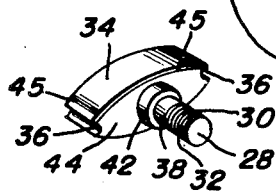

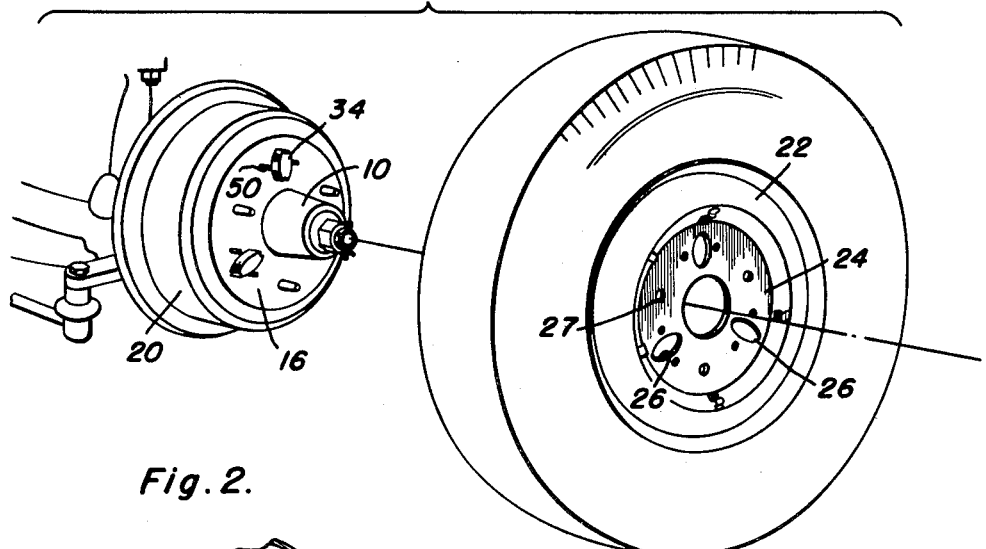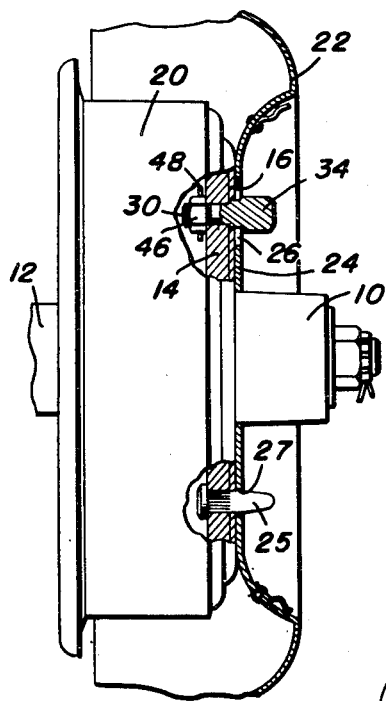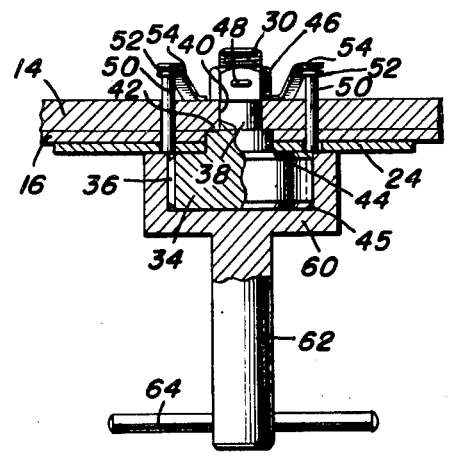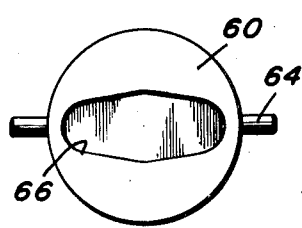
March 9, 1954 — D. ADAMS — 2,671,694
DEMOUNTABLE WHEEL CONSTRUCTION
Filed April 21, 1952 — 2 Sheets-Sheet 1
Fig. 1.
Fig. 2.
Fig. 3.
Fig. 4.
David Adams
INVENTOR.

Patented Mar. 9, 1954

2,671,694

UNITED STATES PATENT OFFICE 2,671,694

DEMOUNTABLE WHEEL CONSTRUCTION

David Adams, Roseville, Mich.

Application April 21, 1952, Serial No. 283,408

14 Claims. (Cl. 301—9)

This invention comprises novel and useful improvements in an improved demountable wheel and more specifically pertains to an improved fastening means for retaining demountable wheels upon a hub assembly of a vehicle.

The primary object of this invention is to provide an improved fastening construction for retaining demountable wheels upon the hub assemblies of vehicles which will greatly reduce the time required for replacing a wheel upon a hub assembly; will enable the wheel to be more firmly secured to the hub assembly and locked in an improved manner against accidental removement therefrom; and wherein the use of a wheel fastener wrench will serve to automatically unlock the locking means and permit quick release of the fastening means.

A further object of the invention is to provide an improved fastener of the character hereinbefore set forth which may be readily applied to all conventional wheel and hub assemblies of vehicles.

These, together with various ancillary features and objects of the invention, which shall later become apparent as the following description proceeds, are attained by the present invention, a preferred embodiment of which has been illustrated, by way of example, in the accompanying drawings, wherein:

Figure 1 is a fragmentary exploded perspective view of a portion of a motor vehicle showing a hub brake drum assembly together with a demountable wheel incorporating therein the principles of this invention;

Figure 2 is a vertical longitudinal sectional view taken substantially upon the plane indicated by the section line 2—2 of Figure 5 and showing the manner in which the demountable wheel is secured to the hub and brake members in accordance with this invention, parts being shown in elevation and parts being broken away;

Figure 3 is sectional detailed view taken upon an enlarged scale through one of the fasteners and showing a wrench applied thereto for releasing the locking pins by which the fasteners are locked in position;

Figure 4 is a rear end view of the fastener wrench, showing the socket for receiving the headed end of the fastener;

Figure 5 is a fragmentary elevational view of a hub and wheel assembly with the wheel mounted upon the hub assembly and the fastening means being indicated in their locked position, the locking pins being engaged with the fastening means, and the hub cap of the vehicle wheel being removed;

Figure 6 is a fragmentary vertical sectional view of the wheel and hub assembly of Figure 5, but taken from the brake drum side of the assembly and from the reverse side of Figure 5;

Figure 7 is a fragmentary vertical sectional detailed view taken through the axis of one of the locking pins and showing certain structural details of the fastener locking means of this invention;

Figure 8 is a perspective view of one of the headed fasteners of this invention; and, Figure 9 is a detail view, taken upon the plane indicated by the section line 9—9 of Figure 5 and showing a further locking feature of the invention.

Referring now more specifically to the accompanying drawings, wherein like numerals designate similar parts throughout the various views, it will be seen that the novel fastener in accordance with this invention is shown applied to a conventional wheel and hub assembly, the conventional wheel hub being indicated by the numeral 10 being shown as mounted upon a vehicle axle 12 which as indicated may constitute the front axle of the vehicle, although it will be apparent that the principles of the invention are applicable to wheel hubs of both front and rear axles.

The wheel hub 10 includes the customary wheel flange 14 and is provided with a brake drum closure plate 16 which seals and rotatably engages the end of a stationary brake drum 20 in accordance with the usual practice.

The usual demountable wheel assembly indicated generally by the numeral 22 includes a mounting plate 24 disposed at the center of the wheel, which plate is adapted to abut against the wheel mounting flange 14 of the hub assembly and the closure plate 16 of the brake drum assembly.

As well understood in the art, the usual demountable wheel assembly is provided with a series of bolt holes in the plate 24 which are adapted to engage upon studs, not shown, carried by the flange 14 extending through the brake drum closure plate 16, usual fastening nuts being secured upon the outwardly extending shanks of the bolts to thus removably retain the wheel assembly upon the hub assembly. The conventional assembly also includes a plurality of dowel pins 25 which are fixedly mounted and extend through the hub and brake drum members 14 and 16 to provide dowel pins for engagement in dowel pin holes 27 formed in the wheel plate member 24 for thus positioning the demountable wheel upon the hub assembly and preventing relative rotation therebetween.

As is well understood, the changing of a demountable wheel in conventional practice is usually relatively laborious and time consuming inasmuch as each of the nuts must be individually unthreaded from the threaded portion of the shank of the stud, the demountable wheel removed, a substitute wheel replaced, and the fastening lugs then being laboriously tightened.

In the present invention, the conventional wheel and hub elements heretofore employed are likewise used. However, the plate 24 of the wheel assembly has the bolt holes enlarged therein to form relatively elliptical apertures 26, whose major axes are disposed radially of the wheel and hub assembly. The usual wheel securing studs of the hub assembly are removed and replaced by novel fasteners in accordance with this invention to be hereinafter described, or if desired, new appropriately spaced holes are provided extending through the plate 16 of the flange 14, and between pairs of adjacent dowel pins. Fasteners are then secured in these apertures and cooperate with the apertures 26 for detachably mounting the wheel assembly upon the hub assembly as set forth hereinafter.

Moreover, as shown in the detail view of Figure 9, the engaging surfaces of the members 24 and 16 may be provided with complementary, radially extending grooves and ribs 25' which are adapted to frictionally engage and interlock, further assisting in preventing relative rotation of the members.

The novel fastener employed with the wheel and hub assembly after the latter has been modified, comprises a cylindrical shank 28, see Figure 8, which is externally threaded at one end as at 30 and provided with a diametrical bore 32. At its other end, the shank is provided with a laterally enlarged head 34 which as illustrated may conveniently be of elliptical shape and which conforms in shape to the apertures 26 but is of slightly less over-all size whereby the head may be snugly passed through the apertures when the shank is disposed in a predetermined position with respect to its axis of rotation.

Upon its periphery, the head 34 is provided with one or more locking recesses 36, which may be placed in any desired location upon the head, and as shown may conveniently comprise semi-cylindrical bores or recesses whose axes are parallel to the axis of the shank 28, and which are disposed upon the periphery of the head.

Intermediate the headed portion 34 and the screw threaded portion 30, as best shown in Figure 3, the shank is provided with a cylindrical bearing portion 38 which is substantially equal in length to and is rotatably received in cylindrical apertures 40 formed in the wheel mounting flange 14 of the hub assembly. As above mentioned, the apertures 40 may be either the original fastening stud apertures from which the studs have been removed; or may be those apertures drilled out to a large diameter or even new apertures. In any event, these apertures are designed to rotatably and snugly journal the cylindrical bearing portion 38 of the shank of the fastener.

At the opposite end of the cylindrical bearing portion 38 from the screw threaded portion 30, the shank is provided with a shouldered portion 42 which is adapted to abut against the plate member 14 or if desired, the plate member 16. It is however, preferred to enlarge the bore through the plate member 16 so as the main portion of the shank 28 may be journaled in the latter with the shoulder portion abutting against the flange 14 as shown in Figure 3.

The shank 28 is of sufficient length to extend beyond the plate 16, and to snugly pass through a corresponding aperture in the plate portion 24 of the demountable wheel assembly. Upon that portion or surface of the head 34 which is adjacent the shank 28, there is provided an inclined, sloping cam surface 44. This surface constitutes the fastening surface of the fastener.

The top and bottom periphery of the head 34 is bevelled as at 46 to facilitate engagement by a socket wrench as set forth hereinafter; to facilitate passage through the elliptical apertures 26; and to facilitate turning and locking engagement of the head 34 upon the member 24.

When the fasteners are assembled upon the hub assembly, the shank portion is inserted through the plates 16 and 14, with the shoulder 42 of the shank abutting against the surface of the plate 14. In this position, a fastening nut 46 is screw threaded upon the end of the shank abutting against the opposite side of the plate 14 from the shoulder 42, and a cotter pin 48, or other suitable fastening means is disposed in registering diametrical bores through the nut and through the bore 32 of the shank for retaining the nut upon the shank.

It will thus be seen that the fastener is securely fastened and mounted upon the plate 14 and while prevented against axial or lateral movement relative to that plate, is capable of free rotation thereon.

With the major axis of the elliptical head 34 disposed radially of the hub assembly, the corresponding apertures 26 of the wheel plate 24 are aligned therewith, whereby the wheel may be mounted upon the hub assembly and the ends 34 may pass through the aperture 26. It will now be seen that upon rotation of the heads, the cam surface 44 of the same will bear against the exterior surface of the wheel plate 24 and press this plate tightly against the hub and brake shoe members 14 and 16. When the headed fasteners are turned so that their minor axes are disposed radially, as shown in Figure 5, it will be evident that the wheel assembly will be tightly secured to the hub assembly.

It will also be seen that a minimum time is required to effect this locking of the wheel assembly upon the hub assembly since it is only necessary to rotate the fasteners through ninety degrees in order to obtain the maximum locking effect, as contrasted with many turns customarily required to secure the ordinary fastening lugs of a demountable wheel assembly.

A securing means is provided for locking the fastening means in fastened position. This securing means, as shown best in Figures 6, 7 and 3 consists of one or more locking pins 50 which are slidably received in aligned apertures in the plates 14 and 16 and are adapted to register with the locking recesses 36 on the periphery of the head 34 when the latter is in its locked position. These locking pins are provided with shoulders or headed portions 52 which prevent the pins from passing entirely through the plates 14 and 16, and resilient means in the form of leaf springs 54 are secured to the opposite side of the plate 14 from the heads 34, as by rivets or the like 56.

These springs pass over the ends of the locking pins and urge the same into their locking position. This position is shown in Figure 7 while the locking pins in their released position are shown in Figure 3.

A tool is provided, see Figures 3 and 4, to simultaneously release the locking pins from their locking engagement with the heads 34 of the fasteners, and for rotating these heads to disengage the fasteners from the demountable wheel assembly. This tool may conveniently comprise a head 60 having a stem 62 and a handle 64 whereby the same may be rotated. The head 60 is provided with an elliptical shaped socket 66 adapted to snugly engage and receive the head 34 of the fastener. The surface of the head 60 adjacent the socket 66, as is shown in Figure 3, is adapted to engage and depress the end of the locking pins when the head of the tool is placed upon the head of the fastener. Thus, the mere act of placing the tool upon the head of the fastener will serve to release the locking pins by depressing the same against their springs, the locking pins being forced into the position shown in Figure 3, whereupon the tool may be rotated to thus turn the heads 34 to cause the same to either be locked or released from the locking engagement with the wheel plate 24.

In order to facilitate the turning of the tool and the fastener heads 34 to the locking or unlocking position of the same, whereby the recess 36 will register with the locking pins, suitable indicia marks may be placed upon the plate 24 to correspond with cooperating marks upon the tool head 60.

It will of course be understood that the heads 34, illustrated as being of elliptical shape, may be of any other desired shape whereby a small angular rotation of the same will either lock or release the head from the wheel plate. Similarly, one or more locking pins may be provided as desired.

It will thus be apparent that the dowel pins serve to relieve the fasteners from strains which would otherwise be imparted thereto by the torque transmitted between the demountable wheel assembly and the hub assembly. At the same time, the dowel pins assist in positioning the demountable wheel assembly and plate 24 thereof whereby the apertures 26 register with the enlarged heads 34 to facilitate application of the demountable wheel to the hub assembly or its removal therefrom.

From the foregoing, the construction and operation of the device will be readily apparent and further explanation is believed to be unnecessary.

However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. A demountable wheel construction comprising wheel hub and brake members, a demountable wheel and a fastener removably securing the wheel to said members, said fastener comprising a shank journaled in said members, a laterally enlarged head on said shank, said wheel having an aperture shaped complementary to the enlarged head for passage of the latter in one position only, a locking pin slidably carried by said members, said head having a recess for receiving said locking pin, when said head is in a predetermined position, resilient means urging said locking pin outwardly from said members for engagement in said recess.

2. A demountable wheel construction comprising wheel hub and brake members, a demountable wheel and a fastener removably securing the wheel to said members, said fastener comprising a shank journaled in said members, a laterally enlarged head on said shank, said wheel having an aperture shaped complementary to the enlarged head for passage of the latter in one position only, a locking pin slidably carried by said members, said head having a recess for receiving said locking pin, when said head is in a predetermined position, resilient means urging said locking pin outwardly from said members for engagement in said recess, said shank having a threaded portion, means engaging the latter and securing said fastener to said members.

3. A demountable wheel construction comprising wheel hub and brake members, a demountable wheel and a fastener removably securing the wheel to said members, said fastener comprising a shank journaled in said members, a laterally enlarged head on said shank, said wheel having an aperture shaped complementary to the enlarged head for passage of the latter in one position only, a locking pin slidably carried by said members, said head having a recess for receiving said locking pin, when said head is in a predetermined position, resilient means urging said locking pin outwardly from said members for engagement in said recess, said resilient means comprising a leaf spring mounted on said members on the opposite side thereof from said head.

4. A demountable wheel construction comprising wheel hub and brake members, a demountable wheel and a fastener removably securing the wheel to said members, said fastener comprising a shank journaled in said members a laterally enlarged head on said shank, said wheel having an aperture shaped complementary to the enlarged head for passage of the latter in one position only, a locking pin slidably carried by said members, said head having a recess for receiving said locking pin, when said head is in a predetermined position, resilient means urging said locking pin outwardly from said members for engagement in said recess, said head having an inclined cam surface on the head face adjacent said members.

5. A demountable wheel construction comprising wheel hub and brake members, a demountable wheel and a fastener removably securing the wheel to said members, said fastener comprising a shank journaled in said members, a laterally enlarged head on said shank, said wheel having an aperture shaped complementary to the enlarged head for passage of the latter in one position only, a locking pin slidably carried by said members, said head having a recess for receiving said locking pin, when said head is in a predetermined position, resilient means urging said locking pin outwardly from said members for engagement in said recess, said shank having a cylindrical portion rotatably received in said members, a shouldered portion and a securing means on said shank on opposite sides of said cylindrical portion engaging said members and preventing passage of said shank therethrough.

6. A demountable wheel construction comprising wheel hub and brake members, a demountable wheel and a fastener removably securing the wheel to said members, said fastener comprising a shank journaled in said members, a laterally enlarged head on said shank, said wheel having an aperture shaped complementary to the enlarged head for passage of the latter in one position only, a locking pin slidably carried by said members, said head having a recess for receiving said locking pin, when said head is in a predetermined position, resilient means urging said locking pin outwardly from said members for engagement in said recess, said shank having a cylindrical portion rotatably received in said members, a shouldered portion and a securing means on said shank on opposite sides of said cylindrical portion engaging said members and preventing passage of said shank therethrough, said head having an inclined cam surface on the head face adjacent said members.

7. A demountable wheel construction comprising wheel hub and brake members, a demountable wheel and a fastener removably securing the wheel to said members, said fastener comprising a shank journaled in said members, a laterally enlarged head on said shank, said wheel having an aperture shaped complementary to the enlarged head for passage of the latter in one position only, a locking pin slidably carried by said members, said head having a recess for receiving said locking pin, when said head is in a predetermined position, resilient means urging said locking pin outwardly from said members for engagement in said recess, said shank having a cylindrical portion rotatably received in said members, a shouldered portion and a securing means on said shank on opposite sides of said cylindrical portion engaging said members and preventing passage of said shank therethrough, said resilient means comprising a leaf spring mounted on said members on the opposite side thereof from said head.

8. A demountable wheel construction comprising wheel hub and brake members, a demountable wheel and a fastener removably securing the wheel to said members, said fastener comprising a shank journaled in said members, a laterally enlarged head on said shank, said wheel having an aperture shaped complementary to the enlarged head for passage of the latter in one position only, a locking pin slidably carried by said members, said head having a recess for receiving said locking pin, when said head is in a predetermined position, resilient means urging said locking pin outwardly from said members for engagement in said recess, said shank having a cylindrical portion rotatably received in said members, a shouldered portion and a securing means on said shank on opposite sides of said cylindrical portion engaging said members and preventing passage of said shank therethrough, said head having an inclined cam surface on the head face adjacent said members, said resilient means comprising a leaf spring mounted on said members on the opposite side thereof from said head.

9. A demountable wheel construction comprising wheel hub and brake members, a demountable wheel and a fastener removably securing the wheel to said members, said fastener comprising a shank journaled in said members, a laterally enlarged head on said shank, said wheel having an aperture shaped complementary to the enlarged wheel for passage of the latter in one position only, a locking pin slidably carried by said members, said head having a recess for receiving said locking pin, when said head is in a predetermined position, resilient means urging said locking pin outwardly from said members for engagement in said recess, said shank having a cylindrical portion rotatably received in said members, a shouldered portion and a securing means on said shank on opposite sides of said cylindrical portion engaging said members and preventing passage of said shank therethrough, said recess comprising a semi-cylindrical groove in the periphery of said head.

10. A demountable wheel construction comprising wheel hub and brake members, a demountable wheel and a fastener removably securing the wheel to said members, said fastener comprising a shank journaled in said members, a laterally enlarged head on said shank, said wheel having an aperture shaped complementary to the enlarged head for passage of the latter in one position only, a locking pin slidably carried by said members, said head having a recess for receiving said locking pin, when said head is in a predetermined position, resilient means urging said locking pin outwardly from said members for engagement in said recess, said recess comprising a semi-cylindrical groove in the periphery of said head.

11. A demountable wheel construction comprising wheel hub and brake members having wheel engaging and positioning dowel pins, a demountable wheel having apertures receiving said dowel pins, a fastener for removably securing said wheel to said members consisting of a shank journaled in said members between a pair of said dowel pins, a laterally enlarged head on said shank and said wheel having a correspondingly shaped aperture for passage of the head in one position of the latter, a locking pin slidably carried by said members, said head having a locking recess for reception of said locking pin when said head is in a predetermined position.

12. A demountable wheel construction comprising wheel hub and brake members having wheel engaging and positioning dowel pins, a demountable wheel having apertures receiving said dowel pins, a fastener for removably securing said wheel to said members consisting of a shank journaled in said members between a pair of said dowel pins, a laterally enlarged head on said shank and said wheel having a correspondingly shaped aperture for passage of the head in one position of the latter, a locking pin slidably carried by said members, said head having a locking recess for reception of said locking pin when said head is in a predetermined position, means resiliently urging said pin towards said head.

13. In a demountable wheel construction including a wheel and a wheel hub structure, means demountably fastening said wheel to said structure, said means including a fastener having a shank journaled in said hub structure, a laterally enlarged head on said shank, said wheel having an aperture shaped complementary to the enlarged head for passage of the latter therethrough in one position only, a locking pin slidably carried by said hub structure, said head having a recess receiving said locking pin, resilient means on the hub structure urging said locking pin outwardly from said hub structure for engagement in said recess.

14. A wheel and a wheel hub structure and means demountably fastening said wheel and hub structures to one another, said fastening means including a fastener having a shank journaled in said hub structure, a laterally enlarged head on said shank, said wheel having an aperture shaped complementary to the enlarged head for passage of the latter therethrough in one position only, a locking pin slidably carried by said hub structure, said head having a recess receiving said locking pin, resilient means on said hub structure urging said locking pin outwardly therefrom for engagement in said recess.

DAVID ADAMS.

References Cited in the file of this patent

UNITED STATES PATENTS

| Number | Name | Date |
|---|---|---|
| 481,566 | Hunter | Aug. 30, 1892 |
| 1,375,899 | Culp | Apr. 26, 1921 |
| 2,290,388 | Shain | July 21, 1942 |
| 2,484,447 | Cass | Oct. 11, 1949 |

FOREIGN PATENTS

| Number | Country | Date |
|---|---|---|
| 1,129 | Great Britain | of 1913 |
| 517,543 | France | Dec. 18, 1920 |
| 607,458 | France | Mar. 27, 1926 |